April 19, 1960

G. A. LYON 2,933,345

WHEEL COVER

Filed Dec. 1, 1955

Inventor
GEORGE ALBERT LYON

April 19, 1960

G. A. LYON 2,933,345

WHEEL COVER

Filed Dec. 1, 1955

Inventor
GEORGE ALBERT LYON
by Hill, Sherman, Meroni, Gross & Simpson
Attys.

United States Patent Office 2,933,345
Patented Apr. 19, 1960

2,933,345

WHEEL COVER

George Albert Lyon, Detroit, Mich.

Application December 1, 1955, Serial No. 550,248

17 Claims. (Cl. 301—37)

The present invention relates to improvements in wheel structures and more particularly concerns the ornamental and protective covering of the outer sides of vehicle wheels.

An important object of the present invention is to provide vehicle wheels with improved wheel covers.

Another object of the invention is to provide improved wheel cover structure including a composite arrangement.

A further object of the invention is to provide novel wheel cover structure wherein cover retaining fingers serve also for retaining assembled cover components in assembly.

Still another object of the invention is to provide an improved cover construction wherein a novel spoke-like arrangement is attained.

A still further object of the invention is to provide a wheel cover wherein cover retaining fingers are engaged by an assembled cover component for improving the retaining characteristics of the fingers.

Other objects, features and advantages of the present invention will be readily apparent from the following detailed description of certain preferred embodiments thereof taken in conjunction with the accompanying drawings in which.

Figures 1, 6:
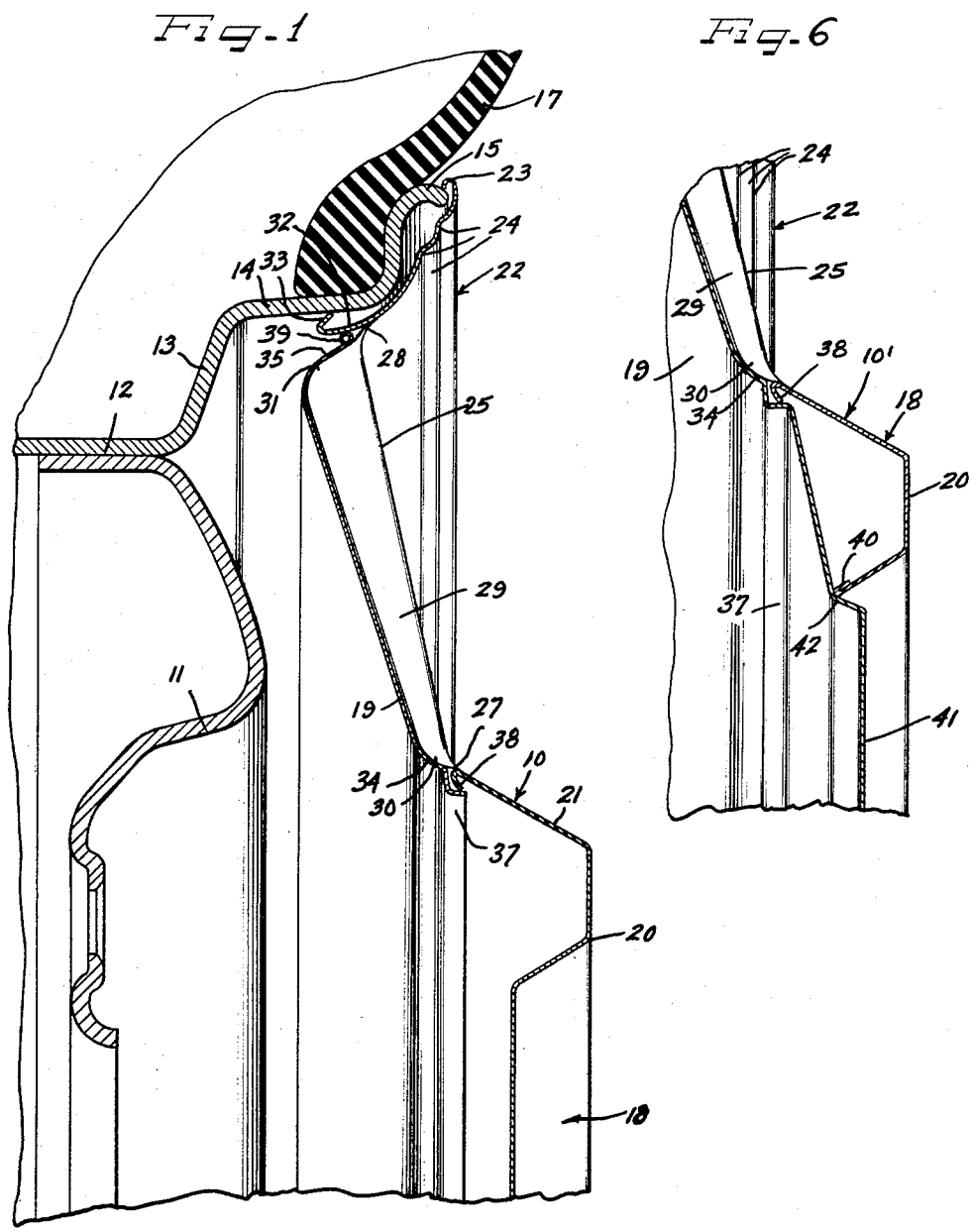
Figure 1 is a fragmentary radial sectional view through a wheel structure showing an embodiment of the invention.
Figure 6 is a fragmentary radial sectional view showing a modified construction of the cover.

A cover 10 embodying features of the present invention is adapted to be applied in press-on, pry-off relation to the outer side of a vehicle wheel including a wheel body 11 and a multi-flange drop center tire rim including a base flange 12 to which the wheel body is suitably secured. The tire rim includes a side flange 13 that faces generally axially outwardly and merges with a generally radially inwardly facing and axially outwardly extending intermediate flange 14 that terminates in a generally radially outwardly and then axially outwardly turned terminal flange 15. A tire and tube assembly or a tubeless tire 17 is adapted to be supported by the tire rim.

According to the present invention, the cover 10 comprises an assembly of an axially outer cover plate 18 and an axially inner cover plate 19. These cover plates are constructed and arranged to be conveniently made from sheet metal such as stainless steel, brass, aluminum or like sheet material and may comprise a combination of materials. For example, the axially outer cover member 18 may be made from a work hardenable material such as stainless steel or brass, while the axially inner cover member 19 may be made from an aluminum alloy which is capable of receiving a surface permeating type of colored finish so as to afford a desirable contrasting, decorative combination with the axially outer cover member.

By preference, the axially outer cover member 18 is constructed as a full disk, that is, it is of a diameter to substantially cover over the entire outer side of the vehicle wheel including the wheel body 11 and tire rim. To this end, the outer cover member 18 includes a central crown portion 20 for overlying the central portion of the wheel body and provided with a generally radially outwardly and axially inwardly sloping annular side wall 21. For overlying the tire rim, the cover plate 18 includes a radially outer annular portion 22 having an underturned finishing and reinforcing bead extremity 23 which may be engageable in assembly upon the wheel with the terminal flange 15. For reinforcing the outer marginal portion 22 it is preferably provided by a series of annular reinforcing rib corrugations 24 serving also as pry-off reinforcement ribs.

At its radially inner side the cover marginal portion 22 is connected to the crown side wall 21 by an inwardly generally dished intermediate cover portion which is subdivided into a uniform series of generally radially extending and generally axially inwardly and radially outwardly sloping spoke elements or members 25 that are formed integrally in one piece with the crown and outer marginal cover portions. At their inner ends the spokes 25 merge on turned junctures 27 with the inner extremity portion of the crown side wall 21. At their radially outer ends the spoke elements 25 merge with the radially inner extremity of the marginal portion 22 on turned junctures 28.

Reinforcement of the spoke elements 25 substantially throughout their length is effected by provision of inwardly divergent longitudinal side wall wing-like flanges 29 of substantial width. Thereby the spoke elements 25 may be fairly narrow and relatively closely spaced but nevertheless of substantial resistance to relative displacement or deformation. At their radially inner ends, the side flanges 29 are tapered or chamfered generally radially outwardly to provide generally axially inwardly and radially inwardly directed shoulders 30, while at their radially outer ends the flanges are chamfered generally radially inwardly and provide generally axially inwardly and radially outwardly facing or projecting shoulders 31.

For retaining the cover on the wheel, the outer marginal cover portion 22 is provided with tire rim engaging means in the form of a series of respective spring retaining finger extensions 32 projecting inwardly generally axially from the radially inner extremity of the cover marginal portion 22 between the spoke elements 25. By preference, the retaining fingers 32 extend the full width between the junctures 28 and of the spoke elements and are therefore of substantial width and transversely arcuate for resilient stiffness. Each of the fingers 32 projects generally axially inwardly on a diameter substantially less than the inside diameter of the axially outer portion of the intermediate flange 14, and has a short and stiff generally radially and axially outwardly oblique retaining terminal 33 that is engageable in retaining gripping edgewise relation against the intermediate flange 14. Thereby the cover can be applied to the outer side of the wheel by pressing it axially inwardly into position on the wheel with the retaining finger terminals 33 retainingly gripping the intermediate flange 14 with progressively increasing tensioned retaining thrust as the retaining finger terminals 33 are cammed radially inwardly to deflect the fingers 32 correspondingly from a slightly larger diameter normal position of the finger terminals.

The axially inner cover member 19 is so constructed and arranged that it can be assembled with the cover plate member 18 by relative axial assembly movement for self-retaining interengagement of the cover members. To this end, the cover member 19 is shaped complementary to the intermediate portion of the cover member 18, and more particularly complementary to the edges of the vane or wing flanges 29 of the spoke ribs 25 so as to be substantially uniformly engaged by the free edges of the spoke flanges. An annular radially inner portion of the cover member 19 provides a turned generally radially and axially outwardly facing shoulder 34 engaging the shoulders 30 of the spoke flanges 29, while a radially outer marginal portion of the cover member 19 provides a turned annular shoulder flange 35 facing generally axially outwardly and radially inwardly and engaging with the radially outer shoulders 31 of the spoke flanges.

For retaining interengagement of the cover members at the radially inner portions thereof, an axial annular radially outwardly facing flange 37 on the cover member 19 underlying the radially outermost portion of the crown side wall or flange 21 adjacent the spoke junctures 27 is engageable in gripping, biting relation by an annular series of generally radially inwardly and axially outwardly oblique underturned retaining fingers 38 derived from material struck out between the spoke terminals 27. The fingers 38 are short and stiff and the extremities or tip ends thereof extend to a slightly smaller diameter than the outside diameter of the flange 37 so that the biting interengagement of the finger tips with the opposing flange surface is quite effective. The effectiveness of the biting interengagement of the fingers 38 with the flange 37 is appreciated when it is considered that there may be as many as 24 such fingers of substantial width, as in the present case, substantially uniformly engaging the flange 37.

At the radially outer extremity of the cover member 19, means are provided for effective frictional interengagement between the cover members. To this end, the extremity or edge portion of the outer marginal flange 35 of the axially inner cover member 19 is provided with a retaining terminal 39 which is preferably directed generally radially outwardly and is so proportioned that it engages against the radially inner faces of the retaining fingers 32 intermediate the ends thereof. In a desirable form, the terminal 39 comprises an annular small, tightly curled bead. The construction and arrangement of the flange 35 and the bead 39 are such that while the marginal flange 35 is interestingly engageable with the shoulders 31 of the spoke flanges the terminal bead 39 is at least lightly engageable with the body portions of the fingers 32 in the normal condition of the cover components before application of the cover assembly to the wheel. Then, as the cover 10 is pressed axially inwardly into retained assembly with the wheel, and the retaining finger terminal flanges 33 cam inwardly along the generally frusto-conically oblique radially inner face of the intermediate tire rim flange 14 and the fingers are thereby radially inwardly resiliently deflected, a tightly wedged, gripped, substantially pinched or clamped interlocking engagement of the retaining terminal 39 between the bodies of the fingers 32 and the contiguous portions of the spoke flange shoulders 31 is effected. As best seen in Figure 1, the axially inner portions of the fingers 32, that is the portions axially inwardly beyond the retaining bead terminal 39 actually underlie the bead 39 and thus provide a positive interlock against slipping of the bead 39 axially inwardly under the most arduous vibrational conditions to which the cover may be subjected in service on the wheel. Weaving motions of the tire rim which may be reflected in corresponding motion or movement of the resilient retaining fingers nevertheless does not result in any loosening or slipping of the retaining terminal bead 39 from its interlocked, anchored relationship in the cover assembly, due not only to the underlying relationship of the axially inner portions of the retaining fingers, but also because there are a large number of the retaining fingers 32, each of substantial width, there being as many as 24, as in the instant case.

In addition to the fingers 32 locking the axially inner cover margin in the assembly by engagement with the terminal bead 39, an advantageous reaction of the finger engagement with the retaining bead resides in that the flexure leverage of the retaining fingers 32 is substantially shortened with the bead 39 serving as a fulcrum for the engaged longitudinally intermediate portion or line contact with the finger bodies. This results in substantially stiffening the resilient flexure of the retaining fingers and more particularly those portions of the fingers axially inwardly from the fulcrum, for thereby enhancing the retaining gripping engagement of the finger terminals 33 with the tire rim intermediate flange 14. Nevertheless, application or mounting of the cover to or on the outer side of the wheel can be effected with facility, while removal of the cover by application of a pry-off tool behind the marginal portion 22 and levering of the pry-off tool against the side wall of the tire 17 and the terminal flange 15 of the tire rim enables the cover to be readily freed from the wheel when desired.

Figure 2:
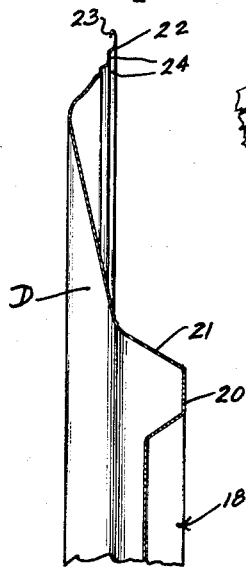
Figure 2 is a fragmentary radial sectional view through a stamped or drawn sheet metal component of the cover assembly of Figure 1 in an initial stage of fabrication thereof.

In making the axially outer cover plate 18, it is first stamped or drawn into the circular major contours thereof substantially as shown in Figure 2, thereby providing the same with an annular solid intermediate more or less dished but generally axially inwardly and radially outwardly sloping portion D. The cover plate 18 as thus drawn may then be conveniently polished.

Figure 3:
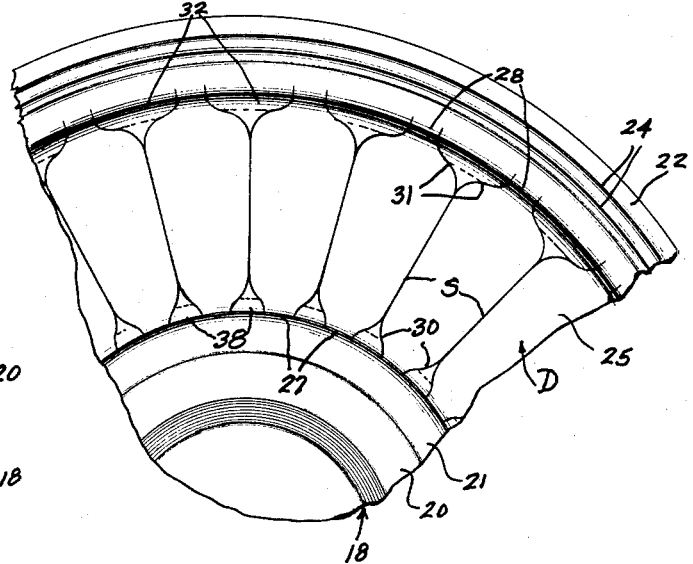
Figure 3 is a fragmentary outer face elevational view of the cover component of Figure 2 showing thereon how the retaining fingers and spokes are severed.

Thereafter the polished cover plate 18 has the intermediate portion D severed along generally radial lines S to outline the spokes 25 including the side flanges thereof, which at their longitudinal edges adjoin in the layout so that substantially all of the material of the intermediate cover portion D at least along the adjoining portions of the longitudinal edges of the spoke portions is utilized in the structure. For outlining the respective inner and outer shoulders 30 and 31 of the spoke elements or portions, the severance lines S diverge on substantially ogee curvatures as shown in Figure 3, thereby also providing tabs of material between the respective terminal junctures 27 and 28 of the spoke portions for formation of the retaining fingers carried by the cover plate 18.

Figure 4:
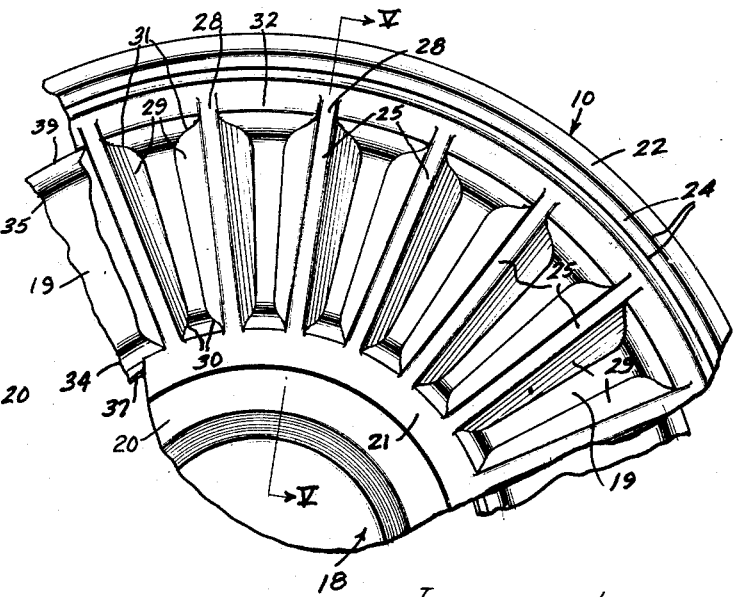
Figure 4 is an outer face elevational view similar to Figure 3 but showing the cover component of Figures 2 and 3 completed and assembled with a backing member.

Following outline severance of the spoke portions, the side wing flanges 29 are bent inwardly into their divergent final arrangement as best seen in Figure 4. Then the cover retaining fingers 32 are worked into their final form after trimming the generally lance shaped tip portions across on generally the transverse dotted lines shown in Figure 3. Similarly, the radially inner fingers 38 are worked into their final position after trimming off the generally lance shaped tips of the material provided therefor along the dotted lines shown in Figure 3. Working of the fingers 32 and 38 substantially hardens the same and improves the resiliency thereof. After completion of the spokes 25 and the sets of retaining fingers the cover may be plated if desired.

Insofar as the axially inner cover member 19 is concerned, it may be fabricated as a stamped or drawn circular piece, and the bead 39 curled thereon. Any preferred finish or surface treatment may be afforded for the piece 19.

Figure 5:
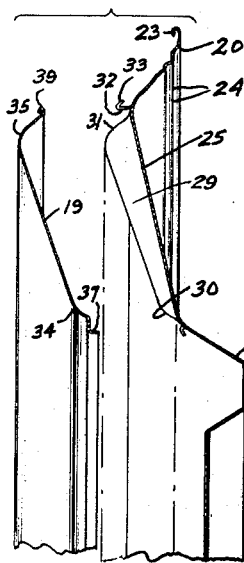
Figure 5 is an exploded assembly view of the components of the cover of Figure 1 taken substantially along the line V—V of Figure 4.

Finally, assembly of the inner cover member 19 with the outer cover member 18 may be effected substantially as indicated in Figure 5 by relative axial assembly movement to engage the spoke flanges 29 with the intermediate body portion of the inner cover member 19, the shoulder 34 with the spoke flange shoulders 30, the shoulder 35 with the spoke flange shoulders 31, and the respective fingers 32 and 38 with the terminal portions of the member 19.

Where it is preferred to have a central portion of the axially inner cover member 19 exposed at the center of the cover assembly for contrasting or decorative purposes or because the inner cover member lends itself more efficiently to provision of a medallion or name plate embossment thereon, or the like, a cover assembly 10' as shown in Figure 6 may be provided. This cover assembly is in most respects the same as the cover assembly 10 with the exception of the treatment of the central or crown area of the assembly. Thus, the crown 20 of the axially outer cover member 18 is centrally cut out and provided with an underturned finishing flange 40 defining a substantial central aperture through which is visible a solid central crown portion 41 of the axially inner cover member 19, thus providing a closure for the central aperture and providing an insert shoulder groove 42 engageable by the turned edge 40. The central portion 41 is provided as an extension from the retaining flange 37 of the inner cover member.

It will be understood that modifications and variations may be effected without departing from the scope of the novel concepts of the present invention.

I claim as my invention:

1. In a wheel structure including a generally radially facing annular flange portion, a cover for disposition at the outer side of the wheel including a cover member having an annular series of generally axially inwardly extending retaining fingers provided with retaining terminals engageable with said flange portion of the wheel, and a member engageable with the retaining fingers intermediate the ends thereof and providing a leverage shortening fulcrum for the retaining fingers for enhancing the retaining grip of the fingers with the annular wheel flange portion.

2. In a wheel structure including a generally radially facing annular flange portion, a cover for disposition at the outer side of the wheel including a cover member having an annular series of generally axially inwardly extending retaining fingers provided with retaining terminals engageable with said flange portion of the wheel, and a member engageable with the retaining fingers intermediate the ends thereof and providing a leverage shortening fulcrum for the retaining fingers for enhancing the retaining grip of the fingers with the annular wheel flange portion, said member comprising a cover plate assembled with said first mentioned cover member.

3. In a wheel structure including a generally radially facing annular flange portion, a cover for disposition at the outer side of the wheel including a cover member having a plurality of spoke elements with retaining fingers intermediate the spoke elements projecting generally axially inwardly and having retaining terminals engageable with said wheel flange, and a member assembled with said cover member and engageable intermediate the ends of said retaining fingers to provide flexure leverage shortening fulcrum for the fingers.

4. In a wheel structure including an annular flange portion facing generally radially, a cover for disposition at the outer side of the wheel including a cover plate having a series of generally radially extending spokes provided by striking out of material intermediate spoke areas thereof, with portions of the material struck out from between the spokes extending generally axially inwardly and having terminals engageable retainingly with said wheel flange, and a flexure leverage shortening annular structure assembled with said cover plate and engaging with said fingers intermediate the ends thereof for enhancing the cover-retaining tension of the fingers against the wheel flange.

5. In a wheel structure including an annular flange facing generally radially, a cover for disposition at the outer side of the wheel including a cover plate having an intermediate annular portion subdivided into a plurality of spokes with material in between the spokes struck out and providing a series of generally axially inwardly projecting retaining fingers having terminal portions engageable under resilient tension with said wheel flange, and a circular cover plate assembled behind said spokes to provide a reinforcing and spoke aperture closing backing for said first mentioned cover plate, said second mentioned cover plate having a marginal flexure leverage shortening structure engageable with said fingers intermediate the ends thereof for enhancing the resilient tensioning of the fingers in engagement with said wheel flange.

6. In a wheel structure including a tire rim and a wheel body, a cover assembly for disposition in retained engagement at the outer side of the wheel and including an axially outer cover plate and an axially inner cover plate assembled with the outer cover plate, said outer cover plate having generally axially inwardly extending cover retaining means thereon and shoulder means opposing the cover retaining means, said inner cover plate having a marginal portion thereof retainingly gripped between said cover retaining means and said shoulder means.

7. In a wheel structure including a tire rim and a wheel body, a cover assembly for disposition in retained engagement at the outer side of the wheel and including an axially outer cover plate and an axially inner cover plate assembled with the outer cover plate, said outer cover plate having generally axially inwardly extending cover retaining means thereon and shoulder means opposing the cover retaining means, said inner cover plate having a marginal portion thereof retainingly gripped between said cover retaining means and said shoulder means, said cover retaining means comprising a series of radially flexible resilient retaining fingers and said inner cover marginal structure comprising a terminal that engages with the retaining fingers intermediate the ends thereof and shortens the flexure leverage of the fingers.

8. In a cover for disposition at the outer side of a vehicle wheel, a cover member having generally axially inwardly directed cover retaining means and shoulder structure in spaced opposition thereto, and a member engaged between said shoulder structure and said retaining means and thereby retained in assembly with the cover member, said retaining means comprising a series of flexible retaining fingers, and said second mentioned member by engagement with said fingers affording flexure leverage shortening fulcrum for the fingers.

9. In a cover for disposition at the outer side of a vehicle wheel, a cover plate having a series of generally radially extending spokes thereon with side flanges on the spokes struck from said cover plate and providing shoulders adjacent one end of the spoke flanges, retaining fingers extending generally axially between the spokes adjacent to said flange shoulders, and a member interposed between said flange shoulders and said fingers and backing said fingers to improve the resilient stiffness thereof.

10. In a cover for disposition at the outer side of a vehicle wheel, an axially outer cover plate having a series of generally radially extending spokes with inwardly extending divergent side flanges and openings between the spokes, and a circular cover plate assembled behind said spokes and engaging said flanges and closing said openings.

11. In a cover for disposition at the outer side of a vehicle wheel, a circular cover plate having an intermediate portion thereof subdivided into a series of generally radially extending spokes with side flanges on the spokes directed generally axially inwardly and affording reinforcement for the spokes, said side flanges being derived from material struck out between the spokes and provided with generally radially facing shoulders at the ends of the flanges leading into juncture terminals of the spokes merging with one of the portions of the cover plate, the cover plate having retaining fingers turned inwardly from material between the spoke junctures adjacent to said spoke flange shoulders, and a second circular cover plate disposed behind said first mentioned circular cover plate and having means thereon retainingly engaged with said spoke shoulders and disposed between said spoke shoulders and said retaining fingers.

12. In a wheel cover plate, an intermediate annular generally dished portion, said dished portion being subdivided along generally radial lines into a plurality of spoke area portions, the material from the severance lines along each side of each of the spoke portion areas being bent to afford inwardly directed spoke flanges with spaces intervening between the spoke flanges of adjacent spokes, material derived from between the spokes worked inwardly between and in spaced relation to adjacent terminal portions of the spokes at one end of said intervening spaces to provide retaining fingers extending behind the cover plate, and an annularly shouldered component assembled with said plate and being retained thereon by a wedged relationship of the same between said fingers and the adjacent terminal portions of the spoke flanges.

13. In a composite cover structure, an axially outer cover plate, an axially inner cover plate, said axially outer cover plate having an annular series of openings with material struck inwardly from respective radially opposite end portions of the openings, said material retainingly interengaging with respective radially inner and radially outer portions of said inner cover plate and thereby retaining the cover plates in assembly.

14. In a composite cover assembly, an axially outer circular cover member, an axially inner circular cover member, the axially outer cover member having an annular series of openings intermediately therein, said axially inner cover member closing said openings, and means on said cover members radially outwardly and radially inwardly located relative to said openings and interengaging in plate retaining relation.

15. In a composite cover assembly, an axially outer circular cover member, an axially inner circular cover member, the axially outer cover member having an annular series of openings intermediately therein, said axially inner cover member closing said openings, and means on said cover members radially outwardly and radially inwardly located relative to said openings and interengaging in plate retaining relation, said outer cover member having a central crown portion and the inner cover member being in the form of an annulus with the radially inner portion of the annulus including the retaining means thereof located radially inwardly relative to said opening.

16. In a composite cover assembly, an axially outer circular cover member, an axially inner circular cover member, the axially outer cover member having an annular series of openings intermediately therein, said axially inner cover member closing said openings, and means on said cover members radially outwardly and radially inwardly located relative to said openings and interengaging in plate retaining relation, the inner of said cover members having a central crown portion and the outer of said cover members having radially inwardly from the radially inner cover retaining means thereof a central opening through which said crown projects.

17. In a cover for disposition at the outer side of a vehicle wheel, a circular cover plate having an intermediate portion thereof subdivided into a series of generally radially extending spokes with side flanges on the spokes directed generally axially inwardly and affording reinforcement for the spokes, said side flanges being derived from material struck out between the spokes and provided with generally radially facing shoulders at respective opposite free ends of the flanges, and a second circular cover plate having shoulder means thereon engaging the side flange shoulders.

References Cited in the file of this patent

UNITED STATES PATENTS

| | | |
|---|---|---|
| D. 169,514 | McLeod | May 5, 1953 |
| 469,484 | Maris | Feb. 23, 1892 |
| 1,956,633 | Tyson | May 1, 1934 |
| 2,089,389 | Lyon | Aug. 10, 1937 |
| 2,092,975 | Hunt et al. | Sept. 14, 1937 |
| 2,202,102 | Horn | May 28, 1940 |
| 2,406,390 | Lyon | Aug. 27, 1946 |
| 2,600,411 | Lyon | June 17, 1952 |
| 2,629,635 | Lyon | Feb. 24, 1953 |